US010688699B2

(12) United States Patent
Oono et al.

(10) Patent No.: US 10,688,699 B2
(45) Date of Patent: Jun. 23, 2020

(54) INJECTION MOLDING SYSTEM

(71) Applicant: FANUC CORPORATION, Yamanashi (JP)

(72) Inventors: Hajime Oono, Yamanashi-ken (JP); Naoaki Seki, Yamanashi-ken (JP); Ryousuke Mori, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/946,035

(22) Filed: Apr. 5, 2018

(65) Prior Publication Data

US 2018/0290353 A1 Oct. 11, 2018

(30) Foreign Application Priority Data

Apr. 7, 2017 (JP) ................. 2017-076421

(51) Int. Cl.
*B29C 45/76* (2006.01)
*B29C 45/00* (2006.01)
(Continued)

(52) U.S. Cl.
CPC .......... *B29C 45/0025* (2013.01); *B29C 45/16* (2013.01); *B29C 45/28* (2013.01);
(Continued)

(58) Field of Classification Search
CPC . B29C 45/0025; B29C 45/7686; B29C 45/16; B29C 45/28; B29C 45/7613; B29C 45/7626; B29C 45/42; B29C 45/14; B29C 45/26; B29C 45/768; B29C 2045/2687; B29C 2045/1486; B29C 2045/2683; B29C 2945/76381; B29C 2945/76421; B29C 2945/76859; B29C 2945/76899; B29C 2945/76943
See application file for complete search history.

(56) References Cited

U.S. PATENT DOCUMENTS

2014/0374959 A1 12/2014 Peplinksi et al.
2016/0279841 A1* 9/2016 Fitzpatrick .............. B29C 31/04

FOREIGN PATENT DOCUMENTS

CN 105658403 A 6/2016
CN 106079330 A 11/2016
(Continued)

OTHER PUBLICATIONS

English Abstract and Machine Translation for Japanese Publication No. 2009-073151 A, published Apr. 9, 2009, 24 pgs.
(Continued)

*Primary Examiner* — Robert J Grun
*Assistant Examiner* — Ninh V Le
(74) *Attorney, Agent, or Firm* — Fredrikson & Byron, P.A.

(57) ABSTRACT

An injection molding system is equipped with a mold having a plurality of cavities, an injection device for injecting a molding material, and a controller for controlling the injection device to mold a plurality of molded parts. The controller includes a determining unit for determining quality of the plurality of molded parts molded at the plurality of cavities. Further, the controller includes a control unit for failure for preventing, when a molded part is judged to be defective, injection to a cavity used for the molded part judged to be good.

8 Claims, 5 Drawing Sheets

(51) Int. Cl.
   *B29C 45/16*   (2006.01)
   *B29C 45/28*   (2006.01)
   *B29C 45/42*   (2006.01)
   *B29C 45/26*   (2006.01)

(52) U.S. Cl.
   CPC ...... *B29C 45/7613* (2013.01); *B29C 45/7626* (2013.01); *B29C 45/7686* (2013.01); *B29C 45/42* (2013.01); *B29C 2045/2687* (2013.01); *B29C 2945/76381* (2013.01); *B29C 2945/76421* (2013.01); *B29C 2945/76859* (2013.01); *B29C 2945/76899* (2013.01)

(56) References Cited

FOREIGN PATENT DOCUMENTS

| CN | 106476198 A |   | 3/2017 |
|----|-------------|---|--------|
| DE | 10033759 A1 |   | 2/2002 |
| DE | 102015012764 A1 |   | 4/2016 |
| DE | 112013003469 B4 |   | 8/2017 |
| JP | 61211012 A |   | 9/1986 |
| JP | 3505183 A |   | 11/1991 |
| JP | 7112475 A |   | 5/1995 |
| JP | 8187761 A |   | 7/1996 |
| JP | 2000850 A |   | 1/2000 |
| JP | 2006231878 A |   | 9/2006 |
| JP | 2008188909 A |   | 8/2008 |
| JP | 200973151 A |   | 4/2009 |
| JP | 201173313 A |   | 4/2011 |
| JP | 2012214008 A | * | 11/2012 |
| JP | 2016128235 A |   | 7/2016 |
| JP | 2016128236 A |   | 7/2016 |

OTHER PUBLICATIONS

English Abstract and Machine Translation for Japanese Publication No. 2008-188909 A, published Aug. 21, 2008, 14 pgs.
English Abstract and Machine Translation for Japanese Publication No. 2006-231878 A, published Sep. 7, 2006, 19 pgs.
English Abstract and Machine Translation for Japanese Publication No. 2000-000850 A, published Jan. 7, 2000, 9 pgs.
English Abstract and Machine Translation for Japanese Publication No. 61-211012 A, published Sep. 19, 1986, 9 pgs.
English Abstract and Machine Translation for Japanese Publication No. 08-187761 A, published Jul. 23, 1996, 13 pgs.
English Abstract and Machine Translation for Japanese Publication No. 07-112475 A, published May 2, 1995, 11 pgs.
English Abstract and Machine Translation for Japanese Publication No. 03-505183 A, published Nov. 14, 1991, 12 pgs.
English machine translation of Decision to Grant a Patent mailed by Japan Patent Office (JPO) for Application No. JP 2017-076421, dated Jan. 8, 2019, 3 pgs.
Untranslated Decision to Grant a Patent mailed by Japan Patent Office (JPO) for Application No. JP 2017-076421, dated Jan. 8, 2019, 3 pgs.
English Abstract and Machine Translation for Japanese Publication No. 2011-073313 A, published Apr. 14, 2011, 12 pgs.
English Abstract and Machine Translation for Japanese Publication No. 2016-128235 A, published Jul. 14, 2016, 34 pgs.
English Abstract and Machine Translation for Japanese Publication No. 2016-128236 A, published Jul. 14, 2016, 26 pgs.
English Abstract and Machine Translation for Chinese Publication No. 106476198 A, published Mar. 8, 2017, 11 pgs.
English Abstract and Machine Translation for Chinese Publication No. 106079330 A, published Nov. 9, 2016, 14 pgs.
English Abstract and Machine Translation for Chinese Publication No. 105658403 A, published Jun. 8, 2016, 49 pgs.
English Machine Translation for German Publication No. DE10033759 A1, published Feb. 7, 2002, 35 pages.
English Machine Translation for German Publication No. DE102015012764 A1, published Apr. 7, 2016, 20 pages.
English Machine Translation for German Publication No. DE112013003469 B4, published Aug. 3, 2017, 22 pages.

* cited by examiner

United States Patent US 10,688,699 B2

INJECTION MOLDING SYSTEM

CROSS-REFERENCE TO RELATED APPLICATION

This application is based upon and claims the benefit of priority from Japanese Patent Application No. 2017-076421 filed on Apr. 7, 2017, the contents of which are incorporated herein by reference.

BACKGROUND OF THE INVENTION

Field of the Invention

The present invention relates to an injection molding system which injects a molding material into a plurality of cavities to mold a plurality of molded parts, and then performs a quality determination of respective molded parts.

Description of the Related Art

Insert-molded articles are molded in the manner of injecting a molding material into a mold with an insert component arranged therein. At this time, in a case where the insert component includes a molding defect, the finished article also includes the molding defect. To avoid this situation, a manufacturing apparatus disclosed, for example, in Japanese Laid-Open Patent Publication No. 2011-073313 takes a configuration that a quality determination is carried out with respect to an insert component before being arranged in a mold.

SUMMARY OF THE INVENTION

An injection molding system may have a configuration that a plurality of cavities are provided in a mold to mold a plurality of molded parts in one cycle. Particularly, when an insert molding is performed with a plurality of insert components arranged, manufacturing efficiency is further improved by molding the insert components and an insert assembled article all at once. Further, in a case where the injection molding system is configured to carry out the quality determination immediately after molding the insert components, it becomes possible to further enhance the efficiency and to judge the molded parts accurately.

However, in the quality determination of such an injection molding system, if all the molded parts are thrown away based on only one of the plurality of the molded parts determined to be defective, an injection molding is again performed in place of those determined good, so that molding material is consumed uselessly.

The present invention has been made with the aforementioned circumstance taken into consideration. It is an object of the present invention to provide an injection molding system capable of suppressing the useless consumption of molding material in a simple configuration even where a molded part determined to be defective is included among a plurality of injection molded parts.

In order to accomplish the aforementioned object, an injection molding system according to the present invention comprises a mold having a plurality of cavities, an injection device configured to inject molding material, and a controller for controlling the injection device to mold a plurality of molded parts through injection of the molding material into each of the plurality of cavities in each cycle, wherein the controller includes a determining unit configured to determine quality of the plurality of molded parts having been molded at the plurality of cavities, and a control unit for failure configured to prevent injection, in the next cycle, to the cavity which was used for the molded part judged to be good, when the plurality of molded parts include a molded part judged to be defective.

According to the present invention, since the injection to the cavity used for the molded part judged to be good is prevented in the next cycle, when the plurality of molded parts include a molded part judged to be defective, it is possible to perform an injection molding only at the cavity which was used for the molded part judged to be defective in the next cycle. As a result, subsequently after a molded member formed using the cavity which was use for the molded part judged to be defective is now judged to be good, it becomes possible to perform an insert molding together with the molded part which has already been judged to be good. That is, even where any of the plurality of molded parts is judged to be defective, it becomes possible to use the molded part judged to be good without wasting it. Accordingly, the injection molding system according to the present invention can suppress the useless consumption of the molding material in a simple configuration.

The above and other objects, features and advantages of the present invention will become more apparent from the following description when taken in conjunction with the accompanying drawings in which a preferred embodiment of the present invention is shown by way of an illustrative example.

DESCRIPTION OF THE PREFERRED EMBODIMENTS

Hereafter, an injection molding system 10 according to the present invention will be described in detail based on a preferred embodiment with reference to the accompanying drawings.

Figure 1:
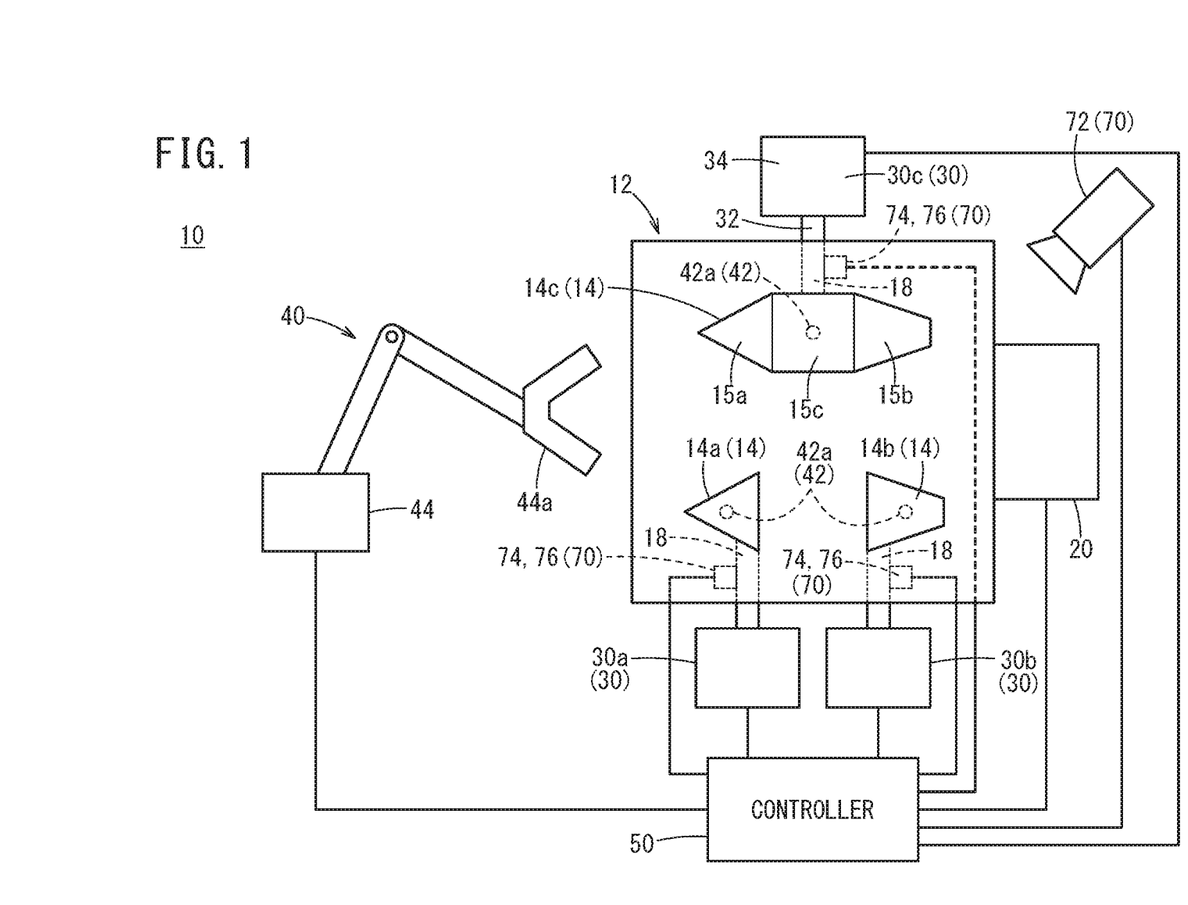
FIG. 1 is a schematic block diagram showing the overall configuration of an injection molding system according to one embodiment of the present invention.
Figure 3:
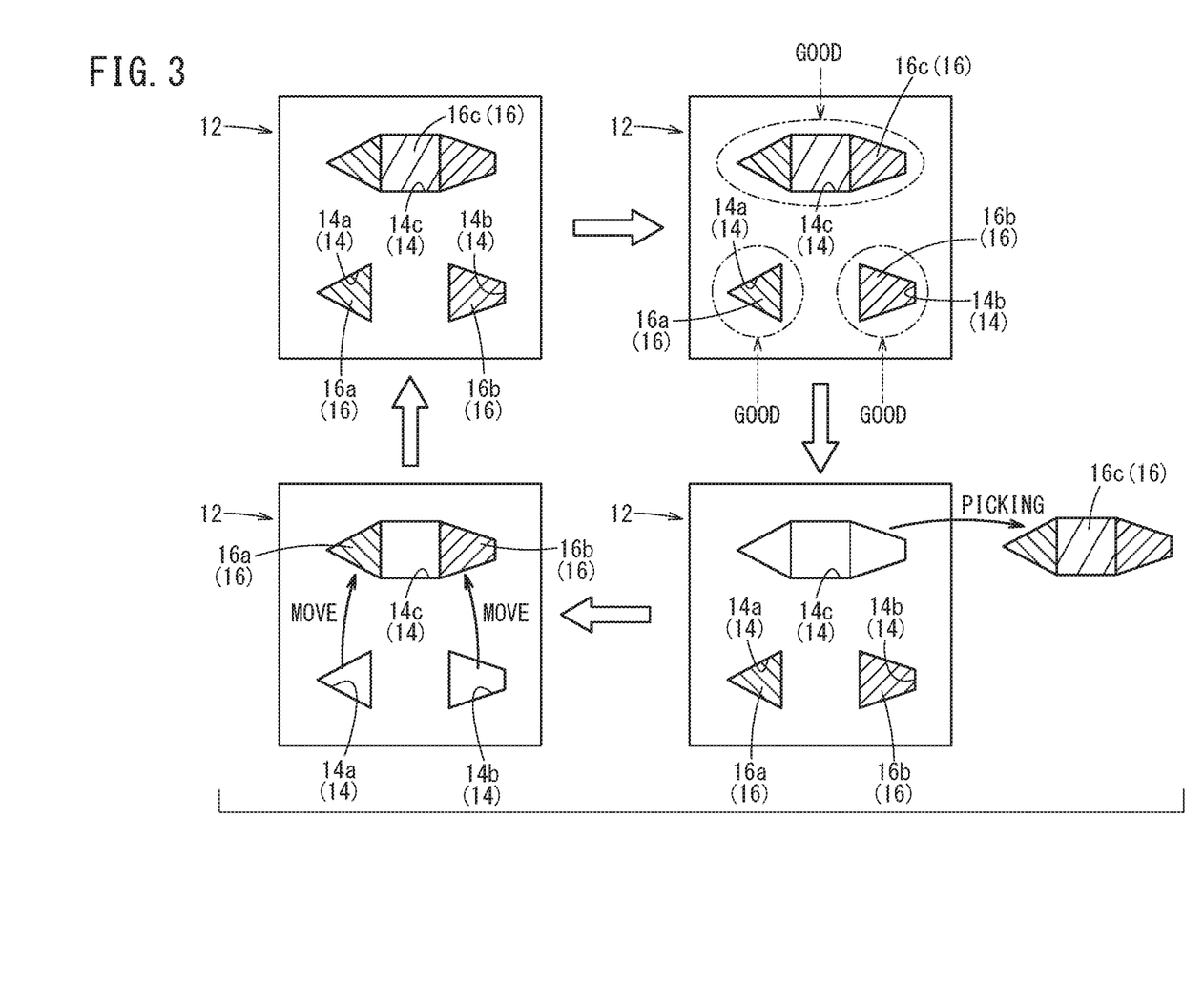
FIG. 3 is an explanatory view illustrating the operation of the injection molding system under a normal control.

As shown in FIG. 1, the injection molding system 10 is equipped with a mold 12 and is constructed as an apparatus which injects a molding material into cavities 14 in the mold 12 to obtain molded parts 16 (refer to FIG. 3). Incidentally, FIG. 1 is a schematic block diagram showing the overall configuration of the injection molding system 10, wherein the mold 12 and the cavities 14 formed in the mold 12 are also schematically illustrated. The mold 12 is configured to close the cavities 14 by clamping two or more mold segments (a fixed mold segment, a movable mold segment and the like) and inject a molding material into the closed cavities 14.

Further, the mold 12 of the injection molding system 10 has a plurality of cavities 14 (refer also to FIG. 3) for molding a plurality of molded parts 16. Specifically, the cavities 14 include a first cavity 14a for molding a first component 16*a* (insert component), a second cavity 14*b* for molding a second component 16*b* (insert component), and a third cavity 14*c* for molding a finished article 16*c* (insert assembled article).

That is, the injection molding system 10 is capable of, by one mold 12, molding the first and second components 16*a*, 16*b* and further of insert-molding the finished article 16*c* using the first and second components 16*a*, 16*b*. Hereinafter, this injection molding system 10 will be described specifically.

Besides the aforementioned mold 12, the injection molding system 10 is equipped with a mold clamping device 20, injection devices 30, a takeout device 40, and a controller 50. Further, the injection devices 30 of the injection molding system 10 include three units (a first injection device 30*a*, a second injection device 30*b*, and a third injection device 30*c*) for supplying molding materials individually to the aforementioned first to third cavities 14*a*, 14*b*, 14*c*.

The first cavity 14*a* is formed in a predetermined mold shape (shown simply as a triangular shape in FIG. 1) capable of molding the first component 16*a*. At the time of an injection molding, a molding material at preset temperature and pressure is supplied to the first cavity 14*a* from the first injection device 30*a*. Then, the filling molding material becomes solidified to mold the first component 16*a*.

The second cavity 14*b* is formed in a predetermined mold shape (shown simply as a trapezoidal shape in FIG. 1) capable of molding the second component 16*b*. At the time of the injection molding, a molding material at preset temperature and pressure is supplied to the second cavity 14*b* from the second injection device 30*b*. Then, the filling molding material becomes solidified to mold the second component 16*b*.

The third cavity 14*c* is formed in a predetermined mold shape having first and second positioning portions 15*a*, 15*b* for arrangements of the first and second components 16*a*, 16*b* and a space 15*c* (shown simply as a rectangular shape in FIG. 1) for integrating the first and second components 16*a*, 16*b*. At the time of the injection molding, a molding material at preset temperature and pressure is supplied to the space 15*c* of the third cavity 14*c* from the third injection device 30*c*. Then, the filling molding materials become solidified to mold the integrated finished article 16*c* including the first and second components 16*a*, 16*b*.

The molding materials injected respectively into the first to third cavities 14*a*, 14*b*, 14*c* may be the same material or different materials. The molding material can be selected by an operator depending on a product scheduled to be molded, and may be any of a resin material or a metal material. For example, it is possible to inject the same material into the first and second cavities 14*a*, 14*b* and a different material into the third cavity 14*c*.

Further, the injection molding system 10 is equipped with a camera 72 facing a partition surface of the fixed mold segment of the mold 12. The camera 72 takes images of the first and second components 16*a*, 16*b* and the finished article 16*c* having been injection-molded at the first to third cavities 14*a*, 14*b*, 14*c* and generates image information thereon. The camera 72 is connected to the controller 50 for communicating information. Under the control of the controller 50, the camera 72 captures images and transmits acquired image information to the controller 50. Although the single camera 72 is provided in the configuration shown in FIG. 1, the camera 72 may be provided for each of the plurality of the cavities 14.

Further, in the mold 12, temperature sensors 74 and pressure sensors 76 are provided in respective fluid passages 18 (gates, runners, or spools) which supply the molding materials to the first to third cavities 14*a*, 14*b*, 14*c*. The temperature sensors 74 are detectors for respectively detecting the temperatures of the molding materials injected into the first to third cavities 14*a*, 14*b*, 14*c*. The pressure sensors 76 are detectors for respectively detecting the pressures of the molding materials injected into the first to third cavities 14*a*, 14*b*, 14*c*. The temperature sensors 74 and pressure sensors 76 are electrically connected to the controller 50 and regularly transmit temperature information and injection pressure information to the controller 50. Incidentally, the temperature sensors 74 and the pressure sensors 76 may be provided at predetermined positions of the first to third cavities 14*a*, 14*b*, 14*c* or may be provided outside the mold 12.

Image information from the camera 72, temperature information from the temperature sensors 74 and injection pressure information from the presser sensors 76 are used for the control under the controller 50. Specifically, with respect to the quality (i.e., good or defective) of the first and second components 16*a*, 16*b* and the finished article 16*c*, the controller 50 determines good or defective based on the respective pieces of information acquired. In this sense, the camera 72, the temperature sensors 74 and the pressure sensors 76 are regarded as a detection unit 70 for the quality determination. The detection unit 70 may be provided with any one of the camera 72, the temperature sensors 74 and the pressure sensors 76. Further, besides those aforementioned, various detectors capable of detecting the molding states of the molded parts 16 (dimension or shape measuring equipment, surface roughness measuring equipment, laser or the like) may be adopted as the detection unit 70.

The mold clamping device 20 of the injection molding system 10 controls the movement of the mold 12 (movable mold segment). The mold clamping device 20 is connected to the controller 50 to communicate information and clamp or open the mold 12 under the control of the controller 50. In the mold clamping, the movable mold segment is advanced to and pressed on the fixed mold segment when molding parts, so that the cavities 14 are closed not to open by failing to cope with the injection pressure of the molding material. Further, after the molded parts 16 are molded, the mold opening is performed to separate the movable mold segment from the fixed mold segment.

The first to third injection devices 30*a*, 30*b*, 30*c* are each equipped with a nozzle 32 protruding toward the mold 12 so that its tip end is in contact with a fluid passage 18 of each cavity 14, and an injection main body 34 for supplying the molding material (pellet) to the nozzle 32. The injection main body 34 is provided with a hopper and the like for supplying the molding material. The nozzle 32 feeds the molding material supplied from the hopper by the rotation of a screw and heats and melts the molding material by a surrounding heater to inject a melted resin. Further, the first to third injection devices 30*a*, 30*b*, 30*c* are also connected to the controller 50 to communicate information and are controlled in injection operations under the control of the controller 50.

The takeout device 40 has a function of picking out the molded parts 16 (the first and second components 16*a*, 16*b* and the finished article 16*c*) from the first to third cavities 14*a*, 14*b*, 14*c*. The takeout device 40 includes ejector mechanisms 42 for advancing and retracting ejector pins 42*a* provided at predetermined positions in the respective cavities 14 and a robot 44 for gripping and transferring the molded parts 16 one after another. The takeout device 40 (the ejector mechanisms 42 and the robot 44) is also connected to the controller 50 to communicate information and is controlled in operation by the controller 50.

After each molding operation, the ejector mechanisms 42 advance the respective ejector pins 42a into the first to third cavities 14a, 14b, 14c to push the first and second components 16a, 16b and the finished article 16c, and demold the first and second components 16a, 16b and the finished article 16c from the first to third cavities 14a, 14b, 14c. The robot 44 is equipped with an end effector 44a having a gripping function and individually transfers the first and second components 16a, 16b and the finished article 16c from the first to third cavities 14a, 14b, 14c. For example, the robot 44 picks and transfers the finished article 16c from the third cavity 14c to a conveyor (not shown) which conveys the finished article 16c to the next process. Alternatively for example, the robot 44 picks and transfers the first and second components 16a, 16b respectively from the first and second cavities 14a, 14b to first and second positioning portions 15a, 15b in the third cavity 14c.

The controller 50 controls the overall operation from the supply of the molding material to the injection molding system 10 to the takeout of the finished article 16c by driving the mold clamping device 20, the first to third injection devices 30a, 30b, 30c and the takeout device 40. Further, the injection molding system 10 is configured to determine the quality (i.e., good or defective) of the molded parts 16 molded by the mold 12, and the controller 50 executes this determination and an appropriate control depending on the determination result.

Figure 2:
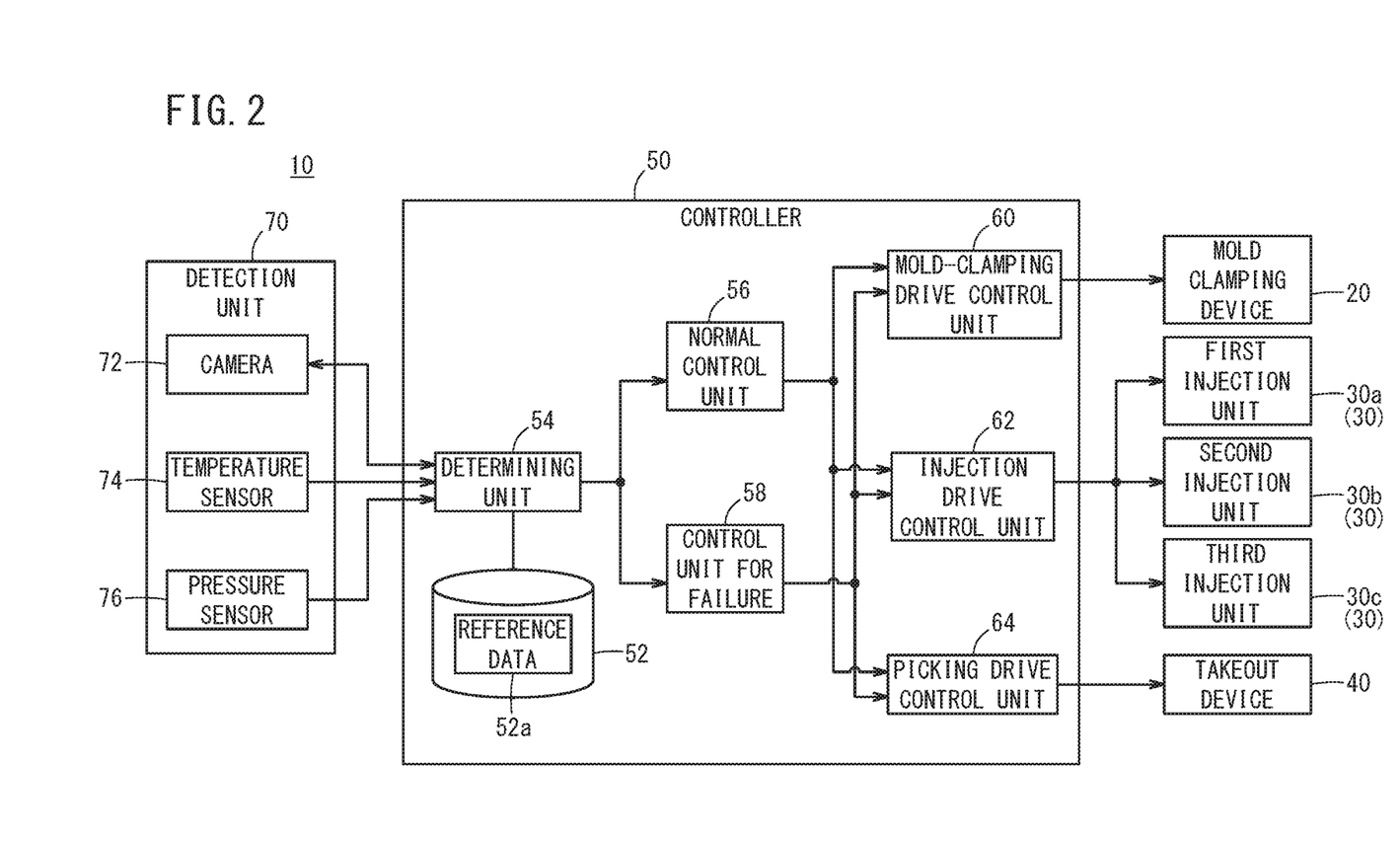
FIG. 2 is a function block diagram of a controller shown in FIG. 1.

The controller 50 employs a computer composed of an interface I/F and a processor which are not shown, a memory 52 and the like shown in FIG. 2. The controller 50 is configured to control the respective units and devices of the injection molding system 10 by processing a control program stored in the memory 52 at its processor.

Specifically, as shown in FIG. 2, inside the controller 50, there are provided a determining unit 54, a normal control unit 56, a control unit for failure 58, a mold-clamping drive control unit 60, an injection drive control unit 62 and a takeout drive control unit 64.

The determining unit 54 of the controller 50 makes quality determinations of the molded states of the first and second components 16a, 16b and the finished article 16c based on the detection information (image information, temperature information, injection pressure information and the like) from the detection unit 70. The determining unit 54, when receiving the detection information, reads out reference data 52a for the first and second components 16a, 16b and the finished article 16c stored in the memory 52 and compares the detection information with the reference data 52a. In correspondence to the detection information, the reference data 52a includes reference shapes, reference images, temperature ranges, injection pressure ranges and the like for the first and second components 16a, 16b and the finished article 16c.

For example, when the injection devices 30 complete one cycle of injection moldings, the determining unit 54 instructs the camera 72 to capture images of the first and second components 16a, 16b and the finished article 16c to acquire image information. Then, the determining unit 54 performs a suitable image processing and the like on the image information to extract shapes of the first and second components 16a, 16b and the finished article 16c, compares the extracted shapes with the reference shapes or the reference images according to the reference data 52a, and confirms from the processed images if any of the first and second components 16a, 16b and the finished article 16c is damaged. Further, the determining unit 54 confirms whether or not the temperature information of the molding materials at the time of the injection molding falls within a temperature range according to the reference date 52a. Further, the determining unit 54 confirms whether or not the injection pressure information of the molding materials at the time of the injection molding falls within an injection pressure range according to the reference date 52a.

If any detection information on the first and second components 16a, 16b and the finished article 16c shows abnormality (the molded part 16 being damaged, the temperature information falling outside the temperature range, the injection pressure information falling outside the injection pressure range, or the like), the molded part 16 is judged to be defective by the determining unit 54. On the other hand, if all the detected information is normal (the molded part 16 not being damaged, the temperature information lying within the temperature range, the injection pressure information lying within the injection pressure range, and the like), the molded part 16 is judged to be good.

The normal control unit 56 and the control unit for failure 58 are function units that are selectively operated based on the aforementioned quality determination result obtained from the determining unit 54. That is, as long as the molded part 16 is judged to be good at the determining unit 54, the determining unit 54 selects the normal control unit 56. Thus, the normal control unit 56 controls the mold clamping device 20, the first to third injection devices 30a, 30b, 30c and the takeout device 40 and repeats the injection molding one cycle after another.

Incidentally, "one cycle" in the description means a series of operations that include the mold clamping of the mold 12 by the mold clamping device 20, the injection molding at any or all the plurality of cavities 14, and the mold opening after the injection molding. Accordingly, even if there is a time lag in injection to the plurality of injection devices 30, as long as the injection devices 30 execute injection molding between the mold clamping and the mold opening, it will be counted as one cycle. Further, in a case where the injection molding is performed by any one of the plurality of injection devices 30 in one cycle, the cycle terminates once the mold opening is performed even though other injection devices 30 have not performed injection operations.

Then, in a case where the quality determination following the injection molding in one cycle indicates defectiveness with respect to any of the plurality of molded parts 16, the determining unit 54 selects the control unit for failure 58. Thus, the control unit for failure 58 discontinues operations following the molding (one cycle) to be executed under the normal control unit 56, and executes control for failure. At this time, the control unit for failure 58 controls the mold clamping device 20 in the same manner as in the case of the normal control unit 56, but controls the first to third injection devices 30a, 30b, 30c and the takeout device 40 differently depending on the molded part 16 judged to be defective. Controls by the normal control unit 56 and the control unit for failure 58 will be described in detail in the following description of operations together with the quality determination by the determining unit 54.

Further, the mold-clamping drive control unit 60, the injection drive control unit 62 and the takeout drive control unit 64 of the controller 50 convert the controls by the normal control unit 56 and the control unit for failure 58 into respective operation instructions (driving signals) and output them to the mold clamping device 20, the first to third injection devices 30a, 30b, 30c and the takeout device 40.

Particularly, the injection drive control unit 62 is capable of controlling the first to third injection devices 30a, 30b, 30c individually (selectively), for example, injecting the molding materials from the first to third injection devices 30a, 30b, 30c simultaneously or sequentially. Alternatively, the injection drive control unit 62 is also capable of selectively preventing the first to third injection devices 30a, 30b, 30c from injecting the molding material in one cycle, based on the instructions from the control unit for failure 58.

The takeout drive control unit 64 is also capable of individually controlling the ejector mechanisms 42 at the first to third cavities 14a, 14b, 14c. Further, the takeout drive control unit 64 suitably instructs the robot 44 to move its arm and the end effector 44a to perform gripping, releasing and the like.

The injection molding system 10 according to the present embodiment is basically constructed as described above. Hereinafter, the effects of the injection molding system 10 will be described as follows.

The injection molding system 10 injection-molds the first and second components 16a, 16b and the finished article 16c in one cycle. Specifically, the controller 50 (the normal control unit 56) drives the mold clamping device 20 to clamp the mold 12. In this clamped state, the first to third injection devices 30a, 30b, 30c are driven to inject the molding materials into the first to third cavities 14a, 14b, 14c. At the time of the injections, the temperature of the molding material is detected by the temperature sensor 74, and the injection pressure of the molding material is detected by the pressure sensor 76. Further, after the molding material is solidified, the normal control unit 56 opens the mold 12 by driving the mold clamping device 20.

Thus, as shown at the upper-left side of FIG. 3, the first component 16a is molded at the first cavity 14a, the second component 16b is molded at the second cavity 14b, and the finished article 16c is molded at the third cavity 14c. That is, the injection molding in one cycle is completed at a stage where the first and second components 16a, 16b and the finished article 16c are molded at the first to third cavities 14a, 14b, 14c. The camera 72 captures the images of the first and second components 16a, 16b and the finished article 16c in the mold open state and transmits image information thus acquired to the controller 50.

Subsequently, the determining unit 54 determines whether the respective molded parts 16 are good or defective based on the image information from the camera 72, the temperature information from the temperature sensor 74, the injection pressure information from the pressure sensor 76 and the like. For example, as shown at the upper-right side of FIG. 3, assuming that all the first and second components 16a, 16b and the finished article 16c are judged to be good, in order to send the finished article 16c to the next step, the controller 50 (the normal control unit 56) demolds (ejection by the ejection pin 42a) the finished article 16c from the third cavity 14c and transfers the finished article 16c to a conveyor (not shown) using the robot 44. Accordingly, the third cavity 14c becomes empty as shown at the lower-right side of FIG. 3.

Thereafter, as shown at the lower-left side of FIG. 3, the controller 50 demolds the first and second components 16a, 16b from the first and second cavities 14a, 14b, and moves the first and second components 16a, 16b respectively to the first and second positioning portions 15a, 15b in the third cavity 14c, using the robot 44. Thus, the first and second components 16a, 16b are positioned at the respective insert positions, while the first and second cavities 14a, 14b become empty. As a result, the preparation for the injection molding in the next cycle is completed.

In this state, the injection molding at the next cycle is performed (that is, the injections of the molding materials by the first to third injection devices 30a, 30b, 30c to the first to third cavities 14a, 14b, 14c are performed), whereby the first component 16a, the second component 16b and the finished article 16c are molded again. In short, the operation state is returned to the state shown at the upper-left side of FIG. 3.

The injection molding system 10 repeats the cycle including those steps shown in FIG. 3 in this way, so that it becomes possible to successively manufacture the finished articles 16c by one mold 12. In a case where the determining unit 54 judges the finished article 16c as being defective, the controller 50 activates the control unit for failure 58 only at the time of transferring the finished article 16c. At this time, the control unit for failure 58 demolds the finished article 16c from the third cavity 14c and transfers the finished article 16c to a discarding site (not shown), using the robot 44. As a result, the defective finished article 16c is excluded, and the mold 12 comes into the state shown at the lower-right side of FIG. 3. Consequently, it becomes possible for the normal control unit 56 to execute the foregoing cycle.

Figure 4:
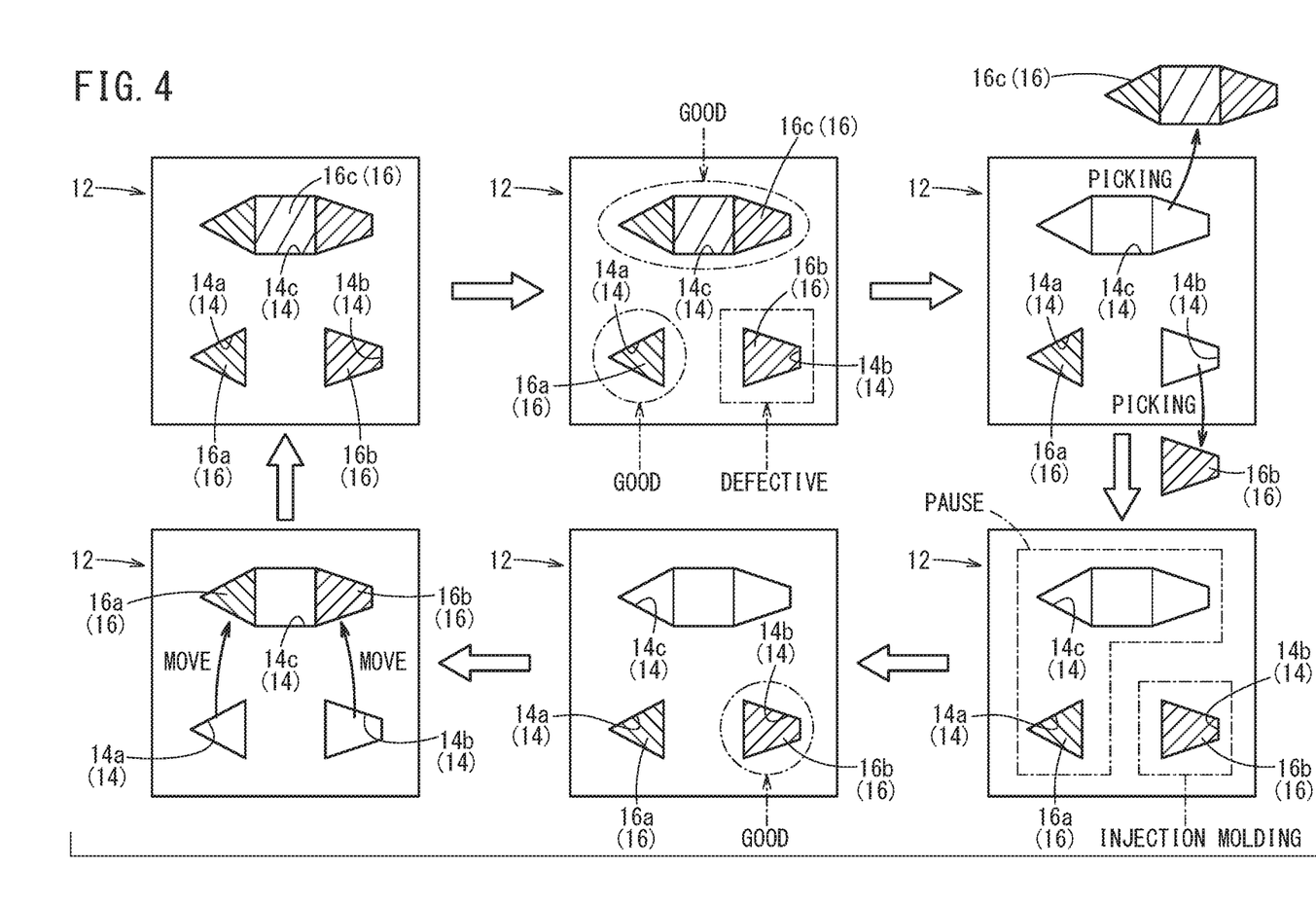
FIG. 4 is an explanatory view illustrating the operation of the injection molding system under a failure control.

Next, with reference to FIG. 4, descriptions will be given regarding the case that the determining unit 54 judges either of the first and second components 16a, 16b to be defective. FIG. 4 typically exemplifies the case that the second component 16b is judged to be defective.

The state shown at the upper-left side of FIG. 4 is a stage at which, like the state shown at the upper-left side of FIG. 3, the first and second components 16a, 16b and the finished article 16c have been molded at the first to third cavities 14a, 14b, 14c upon termination of the injection molding in one cycle. Further, the state shown at the upper-center side of FIG. 4 is a stage at which the determining unit 54 judges the first component 16a as being good and the finished article 16c and the second component 16b as being defective. The determining unit 54 activates the control unit for failure 58 when the second component 16b is judged to be defective.

As shown at the upper-right side of FIG. 4, the control unit for failure 58 demolds the second component 16b from the second cavity 14b and transfers the second component 16b to the discarding site using the robot 44. On the other hand, the first component 16a remains in the first cavity 14a without being taken out. Further, it is desirable that the finished article 16c judged to be good is taken out from the third cavity 14c at this stage as illustrated, and transferred to the conveyor for the next process. Incidentally, like the first component 16a, the finished article 16c may also remain in the third cavity 14c.

Then, as shown at the lower-right side of FIG. 4, at the injection molding in the next cycle, the control unit for failure 58 drives the second injection device 30b only to inject the molding material into the second cavity 14b. In other words, in a cycle following the failure determination, the cavity 14 (the first cavity 14a) used for the component judged to be good is prevented from injection molding. That is, the first and third injection devices 30a, 30c refrain from injection in this cycle. Accordingly, a new second component 16b is molded at the second cavity 14b only.

After the termination of this cycle, the determining unit 54 determines quality of the just molded second component 16b, as shown at the lower-center side of FIG. 4. Once the second component 16b is judged to be good, the first component 16a and the second component 16b both judged to be good are provided in the mold 12. Incidentally, in a case where the second component 16b is again judged to be defective, the second component 16b is taken out, and the injection molding is again performed at the second cavity 14b only. That is, the failure control is continued until all the components are judged to be good. Incidentally, it is preferable that the determining unit 54 is configured to issue an alert indicating abnormality of the cavity 14 in the case of cumulated failure over a predetermined number of times.

When the first and second components 16a, 16b are judged to be good, the determining unit 54 terminates the control by the control unit for failure 58 and restores the control to move the first and second components 16a, 16b to the third cavity 14c by the normal control unit 56. Accordingly, as shown at the lower-left side of FIG. 4, the first and second components 16a, 16b are positioned at the insert positions, while the first and second cavities 14a, 14b become empty, whereby preparation for the injection molding in a subsequent cycle is completed. Consequently, by the injection molding in the subsequent cycle (i.e., the first to third injection devices 30a, 30b, 30c inject the molding materials respectively into the first to third cavities 14a, 14b, 14c), the first component 16a, the second component 16b and the finished article 16c are molded again.

The present invention is not limited to the embodiment. Various modifications of the present invention may of course be applicable without departing from the gist of the present invention. For example, in the embodiment, the mold 12 has the three cavities 14 (the first to third cavities 14a, 14b, 14c). However, the mold 12 may have four or more cavities 14. Further, as far as the mold 12 has a plurality of cavities 14 for insert components, the mold 12 may not necessarily have a cavity 14 for molding an insert assembled article.

Figure 5:
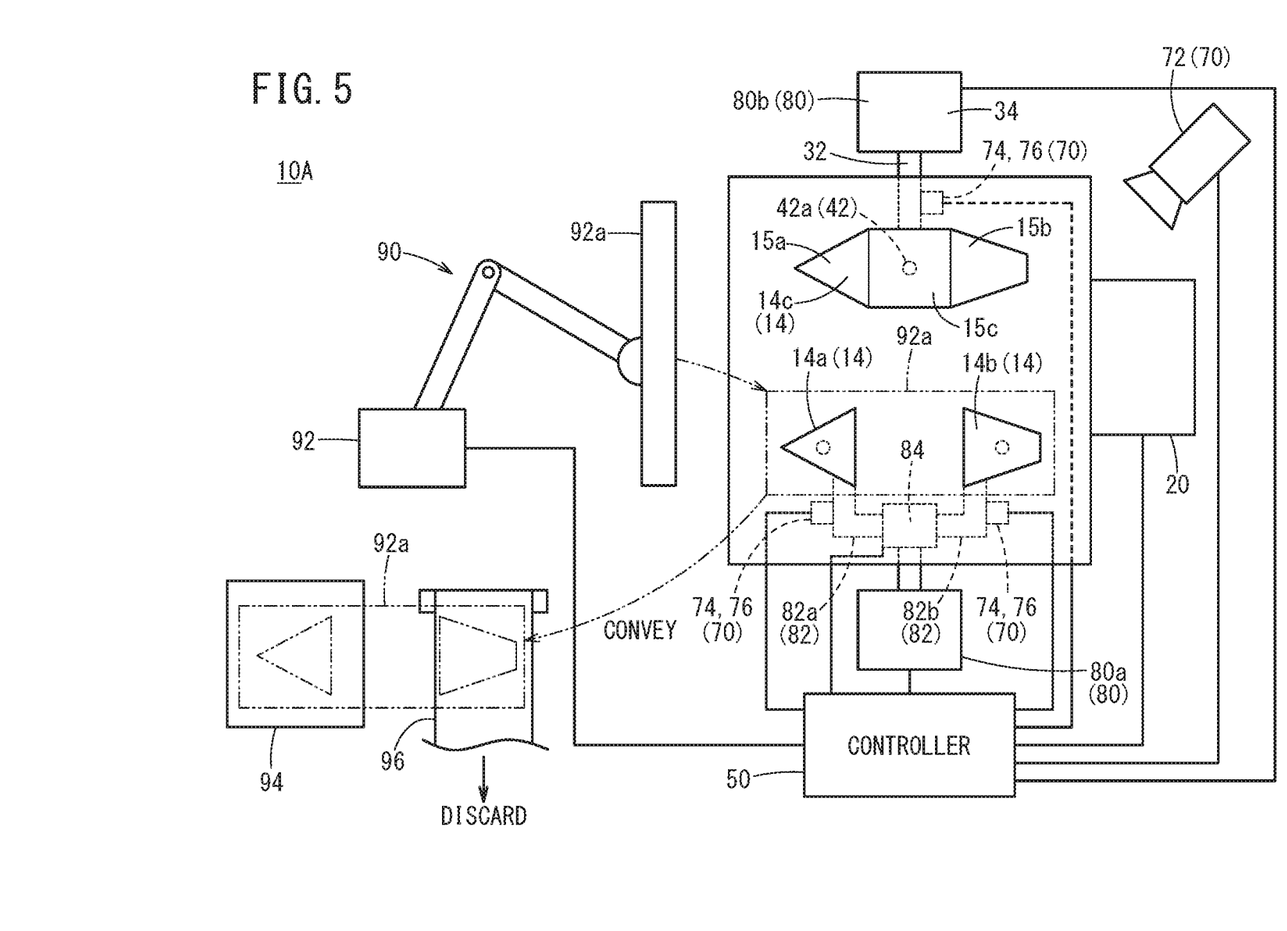
FIG. 5 is a schematic block diagram showing the overall configuration of an injection molding system in a modification.

Next, an injection molding system 10A in a modification will be described with reference to FIG. 5. The injection molding system 10A in the modification differs from the injection molding system 10 in the mold 12, the injection devices 30 and the takeout device 40. In the following description, the same reference numerals are used to indicate the same structural elements or functions as those in the embodiment, and detailed descriptions will be omitted.

Specifically, although the mold 12 is formed of the first to third cavities 14a, 14b, 14c similarly to that in the embodiment, fewer injection devices 80 (two in FIG. 5) are provided for the three cavities 14. In more detail, a first injection device 80a supplies the molding material to the first cavity 14a and the second cavity 14b, and a second injection device 80b supplies the molding material to the third cavity 14c. Thus, the mold 12 is provided therein with a fluid passage 82 through which the molding material from the nozzle 32 of the first injection device 80a is branched and flowed into the first and second cavities 14a, 14b.

A valve 84 is provided at a branch point of the fluid passage 82. The valve 84 is controlled by the controller 50 to switch between open and closed states of each of a first branch passage 82a communicating with the first cavity 14a and a second branch passage 82b communicating with the second cavity 14b. For example, the controller 50 controls the first branch passage 82a to open and the second branch passage 82b to close, so that molding material is injected into the first cavity 14a. On the contrary, the controller 50 controls the first branch passage 82a to close and the second branch passage 82b to open, so that the molding material is injected into the second cavity 14b.

During the injection molding in one cycle, the controller 50 controls to inject the molding material to the first cavity 14a and then to the second cavity 14b by suitably switching the valve 84. Of course, the injection order may be the reverse. Further, in the failure control, the valve 84 should be switched properly to supply the molding material only to one of the first and second cavities 14a, 14b having been judged to be defective. As a result, the injection molding is prevented at the cavity 14 not being targeted.

Further, in a takeout device 90 of the injection molding system 10A, a robot 92 has an end effector 92a capable of taking out the first component 16a and the second component 16b together. For example, the end effector 92a should take a configuration or the like capable of drawing the first and second components 16a, 16b under a negative air pressure.

Then, the robot 92 transfers the first and second components 16a, 16b having been judged to be good to the first and second positioning portions 15a, 15b of the third cavity 14c. If any one of the first and second components 16a, 16b is judged to be defective, the robot 92 holds first and second components 16a, 16b by the end effector 92a and temporarily transfers these components to another site. Specifically, the robot 92 adjusts the posture of the end effector 92a to transfer the component judged to be good to a standby table 94 (standby position) and to transfer the component judged to be defective to the discarding conveyor 96 (discarding site).

With this configuration, the injection molding system 10A according to the modification temporarily retreats the component judged to be good. When an injection molding is performed in the next cycle at the cavity 14 used for the component having been judged to be defective, and the newly molded component is then judged to be good, the controller 50 controls the robot 92 to transfer the component at the standby table 94 and the newly molded component to the respective insert positions at the third cavity 14c. Consequently, thereafter, the insert molding at the third cavity 14c can be performed satisfactorily in a subsequent cycle.

[Technical Concept or Idea Grasped from Embodiment]

A technical concept which can be grasped from the embodiment and the modification will be described as follows.

An injection molding system (10, 10A) comprises a mold (12) having a plurality of cavities (14), an injection device (30, 80) configured to inject a molding material, and a controller (50) for controlling the injection device (30, 80) to mold a plurality of molded parts (16) through injection of the molding material into each of the plurality of cavities (14) in one cycle. The controller (50) includes a determining unit (54) configured to determine quality of the plurality of molded parts (16) molded at the plurality of cavities (14), and a control unit for failure (58) configured to prevent, in a case where a molded part (16) is judged to be defective, injection in a next cycle to a cavity (14) used for the possible molded part (16).

With this configuration, the injection molding system (10, 10A) can perform an injection molding only at the cavity (14) used for the molded part (16) judged to be defective. Then, once a molded part (16) molded at the cavity (14) used for the defective molded part (16) is judged to be good, it becomes possible in a subsequent cycle to perform the insert molding together with the molded part (16) having already been judged to be good. That is, even when any of the plurality of molded parts (16) is judged to be defective, the molded part (16) judged to be good can be used without being thrown away. Accordingly, in a simple configuration, the injection molding system (10, 10A) can prevent the molding material from being consumed uselessly.

In the injection molding system (10), a plurality of injection devices (30) are provided respectively in correspondence to the plurality of cavities (14), and the controller (50) is configured to control the injection devices (30) so that the molding materials are injected into the plurality of cavities (14) simultaneously or sequentially. With this configuration, the injection molding system (10, 10A) can mold the molded parts (16) efficiently using one mold (12).

The injection molding system (10) is provided with a takeout device (40) configured to pick the molded parts (16) individually from the plurality of cavities (14), and the controller (50) is configured to control the takeout device (40) based on a determination result acquired from the determining unit (54) so that the molded part (16) judged to be defective is taken out from the cavity (14) while the molded part (16) judged to be good is not taken out from the cavity (14). With this configuration, the operation time taken by the takeout device (40) can be shortened.

In the injection molding system (10), the controller (50) is configured to control the takeout device (40) to pick the plurality of molded parts (16) when all the molded parts (16) having been molded at the plurality of cavities (14) are judged to be good. With this configuration, it is possible to take out and deliver the molded parts (16) judged to be good all together to the next process (to the insert positions or the like at the cavity (14)).

In the injection molding system (10, 10A), the plurality of cavities (14) include a plurality of cavities for component (14a, 14b) for molding insert components (16a, 16b) as the molded parts (16) and a cavity for insert assembled article (14c) for molding an insert assembled article (16c) with the plurality of insert components (16a, 16b) arranged, and the controller (50) is configured to control an operation of the takeout device (40, 90) so that the insert components (16a, 16b) are taken out from the cavities for component (14a, 14b) and are arranged in the cavity for insert assembled article (14c). With this configuration, it is possible to form the insert components (16a, 16b) and the insert assembled article (16c) using the one mold (12), and hence, the manufacturing efficiency can be improved remarkably.

In the injection molding system (10, 10A), the determining unit (54) is configured to determine the quality of the plurality of molded parts (16) by comparing at least one of image information of the molded parts (16), temperature information and injection pressure information of the molding materials injected into the plurality of cavities (14), with reference data (52a) stored in advance. With this configuration, the injection molding system (10, 10A) can determine the quality of the molded parts (16) immediately after the injection molding, and the molded states accurately.

The injection molding system (10A) is provided with fluid passages (82) configured to branch and supply the molding material injected from the injection device (80) to the plurality of cavities (14) and a valve (84) provided at a branch point in the fluid passages (82), and the controller (50) is configured to control the valve (84) so as to switch the cavities (14) to be supplied with the injected molding materials. With this configuration, it is possible to decrease the number of the injection devices (80), and hence, the installation cost can be reduced.

The injection molding system (10A) is provided with a takeout device (90) configured to pick the molded parts (16) from the plurality of cavities (14) all at once under a control of the controller (50), and the controller (50) is configured to control the takeout device (90) based on a determination result acquired from the determining unit (54) so that the molded part (16) judged to be defective is moved to a discarding site (96) while the molded part (16) judged to be good is moved to a standby position (94). With this configuration, the molded part (16) judged to be good can be retreated to the standby position (94). Thus, the molded part (16) judged to be good can be prevented from being damaged in the next cycle where an injection molding is performed at the cavity (14) used for the component having been judged to be defective.

What is claimed is:

1. An injection molding system comprising:
   a plurality of injection devices configured to inject a molding material into a mold having a corresponding plurality of cavities;
   a controller for controlling the plurality of injection devices to mold a plurality of molded parts through injection of the molding material into each of the corresponding plurality of cavities in one cycle;
   wherein the controller includes: a determining unit configured to determine quality of the plurality of molded parts molded at the plurality of cavities; and
   a control unit configured to allow, in a case where a molded part of the plurality of molded parts is judged to be defective, injection to a cavity of the plurality of cavities where the molded part is judged to be defective while preventing injection to a cavity of the plurality of cavities where a molded part of the plurality of molded parts is judged to be good.

2. The injection molding system according to claim 1, wherein: the controller for controlling the plurality of injection devices is configured to inject the molding material into the corresponding plurality of cavities simultaneously or sequentially.

3. The injection molding system according to claim 1, further comprising: fluid passages configured to branch and supply the molding material injected from the plurality of injection devices to the corresponding plurality of cavities; and a valve provided at a branch point in the fluid passages; wherein the controller is configured to control the valve so as to switch the cavities supplied with the injected molding material.

4. The injection molding system according to claim 1, further comprising:
   a takeout device configured to pick the plurality of molded parts individually from the plurality of cavities;
   wherein the controller is configured to control the takeout device based on a determination result acquired from the determining unit so that the molded part judged to be defective is taken out from the cavity of the plurality of cavities while the molded part judged to be good is not taken out from the cavity insert of the plurality of cavities.

5. The injection molding system according to claim 4, wherein:
   the controller is configured to control the takeout device to pick the plurality of molded parts when all the molded parts having been molded at the plurality of cavities are judged to be good.

6. The injection molding system according to claim 1, further comprising:
   a takeout device configured to pick the plurality of molded parts together from the plurality of cavities all at once under the control of the controller;
   wherein the controller is configured to control the takeout device based on a determination result acquired from the determining unit so that the molded part judged to be defective is moved to a discarding site while the molded part judged to be good is moved to a standby position.

7. The injection molding system according to claim 4, wherein: the plurality of cavities include a plurality of cavities for molding insert components as the plurality of molded parts and a cavity for molding an insert assembled article with the plurality of insert components arranged; and the controller is configured to control an operation of the takeout device so that the plurality of the insert components are taken out from the plurality of cavities for molding insert components and are arranged in the cavity for molding the insert assembled article.

8. The injection molding system according to claim 1, wherein: the determining unit is configured to determine the quality of the plurality of molded parts by comparing reference data stored in advance with at least one of image information of the plurality of molded parts, temperature information, and injection pressure information of the molding material injected into the plurality of cavities.

* * * * *